United States Patent [19]

Maiocco

[11] 3,817,675
[45] June 18, 1974

[54] APPARATUS FOR DISPENSING COLORANT IN PLASTICIZED THERMOPLASTIC MATERIAL

[75] Inventor: Humbert Luciano Maiocco, Woodlyn, Pa.

[73] Assignee: Beloit Corporation, Beloit, Wis.

[22] Filed: June 15, 1972

[21] Appl. No.: 263,259

[52] U.S. Cl................. 425/207, 425/376, 259/4
[51] Int. Cl............................................. B29f 3/02
[58] Field of Search .......... 425/205, 208, 209, 376, 425/207; 259/4, 9, DIG. 11

[56] References Cited
UNITED STATES PATENTS

| 3,023,456 | 3/1962 | Palfey | 425/208 |
| 3,358,749 | 12/1967 | Chisholin et al. | 259/4 X |
| 3,404,869 | 10/1968 | Harder | 259/4 |
| 3,711,067 | 1/1973 | Kovacs | 425/209 X |
| 3,746,489 | 7/1973 | Rizzi et al. | 425/205 |

FOREIGN PATENTS OR APPLICATIONS

| 513,380 | 2/1955 | Italy | 425/205 |

Primary Examiner—R. Spencer Annear
Attorney, Agent, or Firm—Parmelee, Miller, Welsh & Kratz

[57] ABSTRACT

An improved thermoplastic article forming apparatus is detailed in which an interfacial surface generator mixing means is coupled to the plasticizing means to provide a resultant thermoplastic mix which has the desired degree of homogeneity.

5 Claims, 1 Drawing Figure

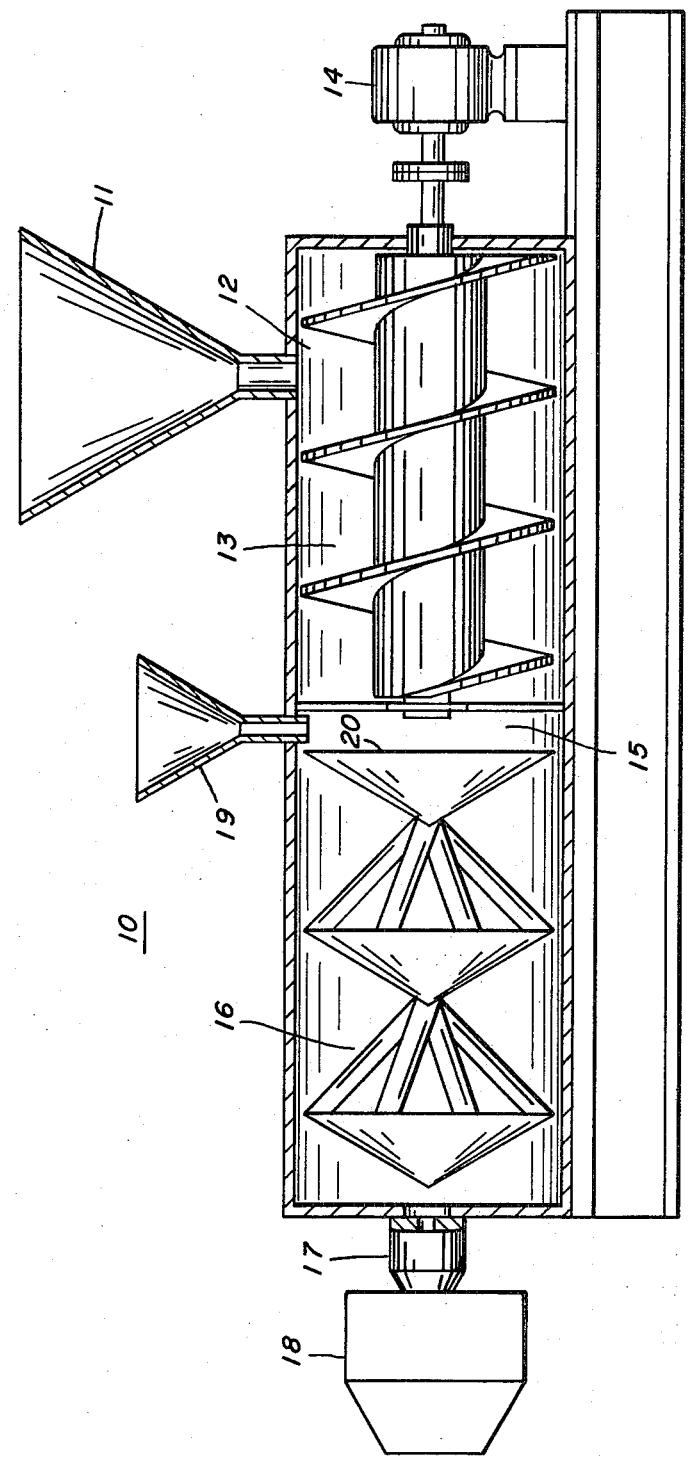

APPARATUS FOR DISPENSING COLORANT IN PLASTICIZED THERMOPLASTIC MATERIAL

BACKGROUND OF THE INVENTION

The present invention relates to thermoplastic article forming apparatus and permits accurate control over the degree of homogeneity of the resultant thermoplastic mix, both with respect to resin mixture and color mixture.

In a conventional thermoplastic article forming apparatus mixing of the thermoplastic material is achieved in the auger screw extruder portion which also plasticizes the material. The conventional auger screw extruder is of considerable length and has a length to diameter ratio of about 20 to 1, or greater. The rotational speed of a conventional auger screw extruder is about 50 to 250 revolutions per minute. The thermoplastic raw mix is thus very thoroughly mixed during the plasticizing process. The thermoplastic mix can contain virgin pellets and ground scrap which are to be mixed to provide a desired homogeneous quality for the plasticized material, or colorant can be added to the thermoplastic pellets to be mixed therewith. The length of the conventional auger screw extruder means that the overall plastic molding apparatus assembly is rather large and elongated, and the extruder itself is costly to fabricate, In plasticizing thermoplastic material in an auger screw extruder, heating elements are conventionally wrapped about the extruder body to assist in plasticizing the material.

An adiabatic auger screw extruder which eliminates the need for the external heating devices is known in the art. Such adiabatic extruders have a very low ratio of length to diameter, being of the order of less than 10 to 1. The screw of such extruders is rotated at high speed, of the order of 300 to 1,500 revolutions per minute, whereby the thermoplastic material is heated to the plastic state by the mechanical heating effect of the screw turning. One problem which has restricted the utility of the adiabatic extruders is the ineffective mixing which is achieved in the very short length of adiabatic extruders.

An interfacial surface generator mixer is a device whereby streams of material can be efficiently and thoroughly mixed without the use of any rotating apparatus. Such interfacial surface generator mixers are shown and described in U.S. Pat. Nos. 3,182,965 and 3,404,869. In such mixers, the material is directed through separate channels and recombined in mixing chambers of predetermined shape, and thereafter again segregated into outlet channels with the mixing occurring by a combination of such mixer stages.

It is sometimes very desirable to control the degree of dispersion of a colorant material into the thermoplastic mixture whereby a mottled effect or marbelized effect can be achieved in the resultant formed article. It is very difficult to regulate the degree of mixing or dispersion of the colorant into the thermoplastic material using a conventional auger screw extruder. In fact the addition of a colorant to such a conventional extruder will result in the thermoplastic material being of a homogeneous single color.

SUMMARY OF THE INVENTION

An improved thermoplastic article forming apparatus is provided including thermoplastic resin feed means, plasticizing means and article forming means. An interfacial surface generator mixing means is coupled to the plasticizing means to mix the thermoplastic material to the desired degree of homogeneity.

A colorant feed means and metering device can be connected to the inlet end of the interfacial surface generator mixer whereby homogeneous colored thermoplastic mix can be provided, or by controlling and limiting the number of stages of the interfacial surface generator mixer a predetermined mottled or marbelized color quality can be achieved for the resultant thermoplastic formed article.

BRIEF DESCRIPTION OF THE DRAWINGS

The sole FIGURE is a schematic representation of a thermoplastic article forming apparatus of the present invention.

DESCRIPTION OF THE PREFERRED EMBODIMENT

The invention can be best understood by reference to the exemplary embodiments shown in the FIGURE wherein the article forming apparatus 10 includes a thermoplastic resin feed hopper 11. The outlet of hopper 11 is connected to the inlet end 12 of plasticizing means 13 which is preferably an adiabatic auger screw extruder. The extruder 13 has a low ratio of length to diameter, preferably being about 10 to 1 or less. Motor means 14 is connected to the extruder 13 for rotating the shaft thereof. The extruder 13 is operable at high rotational speeds, preferably greater than about 300 revolutions per minute and can range as high as about 1,500 revolutions per minute. Other conventional plasticizing means such as a conventional screw, a plunger, or a shear cone can be utilized.

The adiabatic extruder plasticizes the thermoplastic material to the desired degree of plasticity, but does not by itself produce a homogeneous mix quality. Thus, when a portion of the thermoplastic material added to the feed hopper comprises reground scrap material which is to be mixed with virgin pellet material, the adiabatic extruder is not effective by itself in producing a homogeneous mixture of the reground scrap and the virgin pellet material. The same is true when a colorant material is added to the feed hopper and is to be mixed with the thermoplastic material to produce a homogeneously colored molded article.

According to the present invention, the outlet end 15 of the plasticizing means 13 is connected to interfacial surface generator mixer 16. Such a mixer 16, is more completely described in U.S. Pat. Nos. 3,182,965 and 3,404,869. The mixer 16 comprises a plurality of mixing stages which are only shown schematically herein, with the degree of mixing being determined by the number of successive stages. The degree of mixing increases in a geometric progression as the number of stages of mixer elements are increased. It may be necessary to provide heating means with the mixing means 16 to maintain the plasticity of the material passing through the mixer.

The thermoplastic material is thus plasticized in the extruder 13 and completely and efficiently mixed in mixing element 16 and is thereafter directed through conduit 17 into article forming means 18 wherein the thermoplastic molded article is produced. The article forming means shown here is an extrusion die. A colorant containing hopper feed means 19 can be connected at an entrance or inlet 20 of the mixer 16 for the metering of a predetermined amount of colorant material.

When the colorant material is to be completely dispersed throughout the thermoplastic material and a homogeneous color quality is desired for resultant molded product sufficient mixing stages must be provided in the interfacial surface generator mixer to assure such homogeneity, for example at least about four mixing stages would be required. When the colorant material is not intended to be completely and uniformly mixed throughout the thermoplastic material so as to provide a mottled or marbelized effect in the resultant molded article the number of mixing stages to be used is minimized, for example three or less such mixing stages would be used. In this way any predetermined desired color dispersion characteristic can be provided by controlling the colorant feed and metering means associated with colorant hopper 19, as well as by varying the number of mixer stages used for the interfacial surface generator mixer 16.

In the embodiment of the invention already described the thermoplastic material is fed to the plasticizing means, then to the mixing means from which it is fed to the article forming portion of the apparatus. It is also possible to connect the interfacial surface generator mixing means to the thermoplastic feed means and to homogeneously mix pelletized or finely divided thermoplastic resin. The homogeneous mix can then be fed to the plasticizing means to render the material plastic. In this modified embodiment it is necessary to provide a means for moving the thermoplastic material through the mixer. This means can be the force of gravity which is utilized by disposing the mixing means in a vertical fashion, with the thermoplastic resin pellets moving under the force of gravity through the mixer and emerging as a homogeneous mixture.

The adiabatic auger screw extruder preferably used as plasticizing means in the present invention offers several distinct advantages over the conventional auger extruder. The adiabatic extruder does not require external heating elements and power supply to render the material plastic. The material is plasticized as a result of the conversion of the mechanical action of the screw to heat. The short length of the adiabatic extruder permits the article forming apparatus layout to be greatly compacted with a significant saving of floor space.

The interfacial surface generator utilized in the present invention effects thorough mixing very efficiently. In the preferred embodiment the plasticized material is forced from the extruder through the mixer. The mixing is achieved by movement of the material through the mixer without need for any rotating apparatus. Such mixers are thus very efficient, and require a minimum of maintenance.

The article forming apparatus can comprise an injection molding apparatus in which the plasticized thermoplastic mixture is fed to the interfacial surface generator mixing means, and thereafter injected into an injection mold for forming the thermoplastic article. The colorant feed and metering means can again be connected at the inlet end of the interfacial surface generator mixing means.

The present invention provides a convenient means of adding colorant to the plasticized mix rather than to the resin pellets, and for controlling the degree of colorant dispersion, i.e., to provide substantial complete color dispersion or uniformity, or to provide incomplete color dispersion so that the formed article has a marbelized or tortoise shell effect.

I claim:

1. In a thermoplastic article forming apparatus including thermoplastic resin feed means, plasticizing means and article forming means, the improvement comprising coupling the inlet of an interfacial surface generator to the outlet of the plasticizing means, said plasticizing means comprising an adiabatic screw extrusion means having a low length to diameter ratio and being operable at high rotational speed.

2. The apparatus of claim 1 including means for feeding and metering a predetermined amount of colorant material at the inlet of the interfacial surface generator.

3. The apparatus of claim 1 wherein the adiabatic screw extruder has a ratio of length to diameter of about 10 to 1 or less, and the screw is rotatable at a speed of at least about 300 revolutions per minute.

4. The apparatus of claim 2 wherein the interfacial surface generator is provided with a sufficient number of stages whereby the colorant material is homogenously dispersed throughout the plasticized mixture whereby uniformly colored thermoplastic articles may be formed.

5. The apparatus of claim 2 wherein the interfacial surface generator is provided with a sufficient number of stages to permit only a limited degree of colorant material dispersion through the plasticized mixture whereby thermoplastic articles having a mottled or marbelized color characteristic may be formed.

* * * * *